United States Patent [19]

Haitmanek

[11] 4,387,949
[45] Jun. 14, 1983

[54] TRANSITION CONNECTION APPARATUS HAVING GROUNDING FEATURE

[75] Inventor: Louis F. Haitmanek, Florham Park, N.J.

[73] Assignee: Thomas & Betts Corporation, Raritan, N.J.

[21] Appl. No.: 243,042

[22] Filed: Mar. 12, 1981

[51] Int. Cl.³ .............................................. H01R 9/24
[52] U.S. Cl. ............................ 339/125 R; 339/198 R
[58] Field of Search ............ 339/14 R, 119 R, 119 C, 339/119 L, 125 R, 125 L, 198 R, 198 K

[56] References Cited

U.S. PATENT DOCUMENTS

| | | | |
|---|---|---|---|
| 2,698,423 | 12/1954 | Modrey et al. | 339/198 K X |
| 2,710,381 | 6/1955 | Monson | 339/14 |
| 2,968,689 | 1/1961 | Johnson | 174/48 |
| 3,047,650 | 7/1962 | Reiland | 174/49 |
| 3,335,214 | 8/1967 | Brotherhood | 174/48 |
| 3,573,704 | 4/1971 | Tarver | 339/14 |
| 3,597,523 | 8/1971 | Guritz | 174/48 |
| 3,617,611 | 11/1971 | Kuether | 339/14 R X |
| 3,651,245 | 3/1972 | Moll | 174/51 |
| 3,756,447 | 9/1973 | Hadfield | 220/3.3 |
| 3,786,399 | 1/1974 | McHattie | 339/14 R |
| 4,039,235 | 8/1977 | Thibeault | 339/14 |
| 4,240,687 | 12/1980 | Bunnell et al. | 339/99 |
| 4,240,688 | 12/1980 | Sotolongo | 339/122 |
| 4,289,370 | 9/1981 | Storck | 339/125 R |

Primary Examiner—Howard N. Goldberg
Attorney, Agent, or Firm—Robert M. Rodrick; Salvatore J. Abbruzzese; Jesse Woldman

[57] ABSTRACT

A transition connection apparatus provides for electrical interconnection between round conductors in a grounded conduit in an under-floor wiring system and conductors in an insulated flat multiconductor cable in an undercarpet wiring system. A conductive base member having an undulated portion defining a crest supports an insulative member having a plurality of mounting surfaces for joining a plurality of conductors thereon. A plate-member projects from the undulated portion and extends adjacent to and in overlying relation to one of the mounting surfaces. Such plate member and at least one conductor are joined on the one mounting surface. A ground potential is established at such joint through the base member that is conductively coupled to the grounded conduit by a threaded nipple.

22 Claims, 5 Drawing Figures

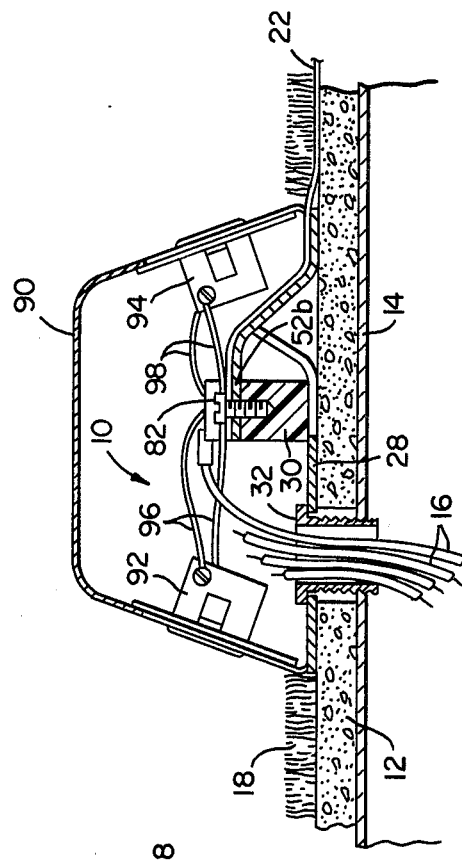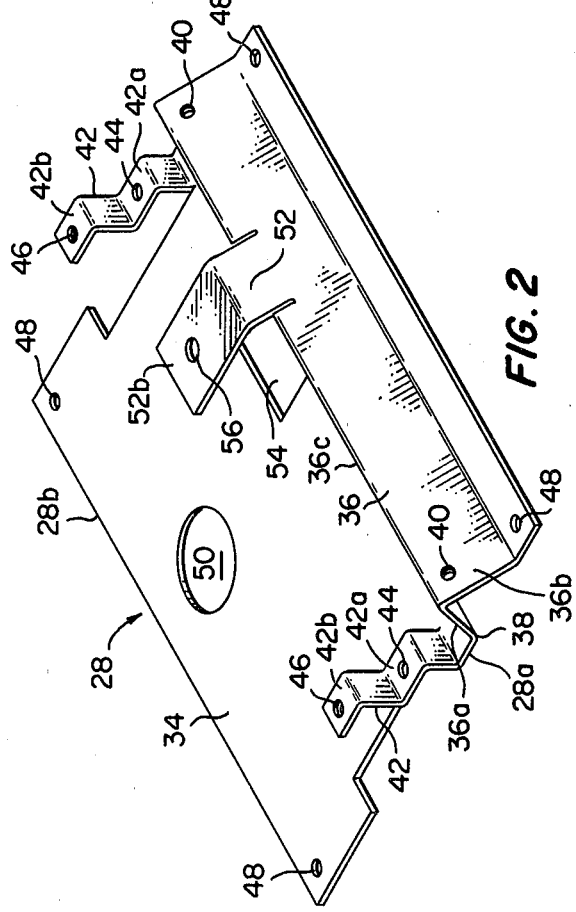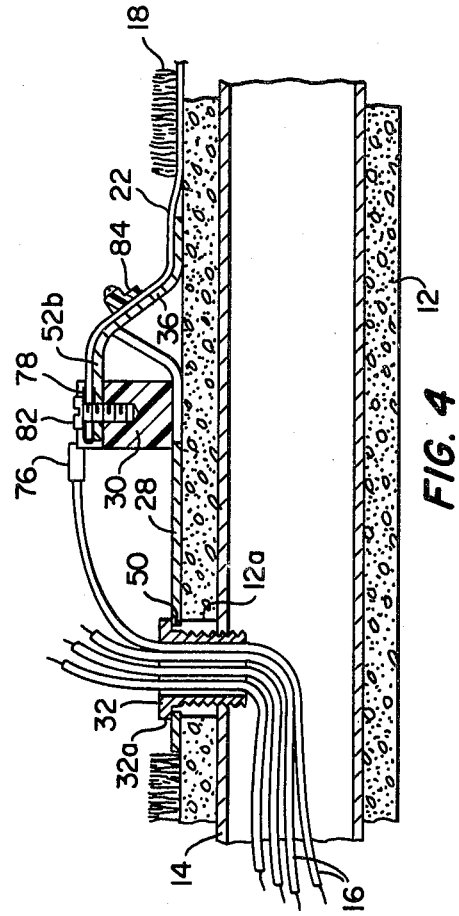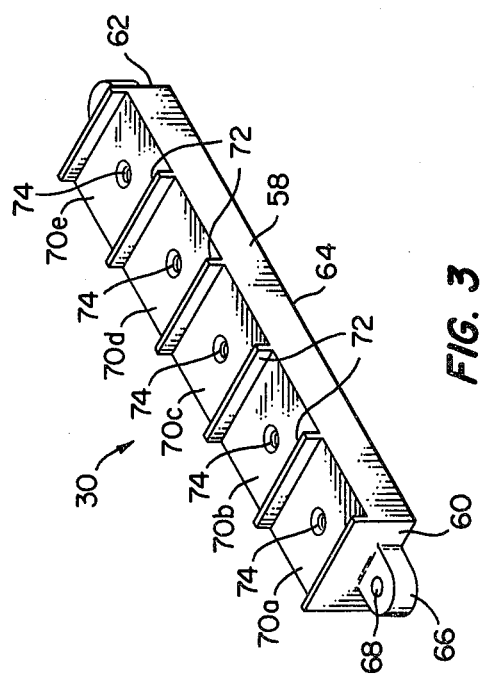

TRANSITION CONNECTION APPARATUS HAVING GROUNDING FEATURE

FIELD OF THE INVENTION

This invention relates to transition connection apparatus for making electrical connection between electrical conductors such as that between round conductors and conductors in flat multiconductor cable and, in particular, to a transition connection apparatus that is especially suited for use in connection with under-floor wiring systems for buildings and for providing suitable ground coupling thereto.

BACKGROUND OF THE INVENTION

Many types of office buildings or other large commercial structures commonly have electrical wiring systems in metallic conduits or ducts that are embedded within the concrete floor in predetermined patterns for each floor area. With the advent of undercarpet wiring systems utilizing flat multiconductor cable and the attendant advantages in equipment layout flexibility and office planning, it is often desirable to interconnect the undercarpet wiring system to the existing conventional under-floor wiring system.

In making such interconnection, consideration is to be given to the grounding connection therebetween. Typically, the under-floor metallic ducts containing the electrical wires are suitably connected to ground. It is common practice in the art to provide grounding connection of standard electric outlet boxes and receptacle housings to the grounded under-floor ducts by means of a threaded conduit nipple through which the electrical wires in the duct may be passed for external connection. While the use of such a nipple provides grounding of the outlet box or housing, further connection is generally required to a grounded circuit of the receptacle. Such connection has been made in the art by means of a separate jumper wire for connecting the grounded outlet box and the grounded circuit of the receptacle. It is desirable to provide an interconnection apparatus having provision for establishing a suitable ground connection and a minimum number of parts which can be efficiently manufactured and readily assembled.

SUMMARY OF THE INVENTION

It is a primary object of the present invention to provide an improved transition connection apparatus for making electrical interconnection between electrical conductors.

It is another object of the present invention to provide a transition connection apparatus for making electrical interconnection between round conductors and conductors in a flat conductor cable with improved grounding capability.

In accordance with the invention, a transition connection apparatus for making electrical interconnection between electrical conductors comprises an insulative member having a plurality of mounting surfaces thereon for joining the conductors thereon. Such mounting surfaces are electrically insulated from each other. A conductive base member is provided for supporting the insulative member thereon. A conductive plate member is secured to the base member and has a portion adjacent to and in registry with one of the mounting surfaces. Means are provided for fastening a conductor and the plate member portion to such one of the mounting surfaces.

In accordance with a particular form of the apparatus, the base member has a planar portion and an undulated portion defining a crest extending transversely across the base member. The insulative member is an elongate block and extends lengthwise on the planar portion substantially parallel to the crest of the undulated portion. Such apparatus is particulary adapted to receive and join on the elongate block the conductors of an insulated flat conductor cable. The plate member is an integral portion of the base member and preferably projects from the undulated portion in overlying relation with one of the mounting surfaces. The apparatus includes provision for suitably coupling the base member to ground to thereby establish a ground path through the base member to the projecting plate member whereby a ground connection is established to one or more conductors joined thereat.

BRIEF DESCRIPTION OF THE DRAWING

FIG. 2 is a perspective view of a base member of the transition connection apparatus of FIG. 1.

FIG. 3 is a perspective view of an insulative member of the transition connection apparatus of FIG. 1.

FIG. 4 is a sectional view of the apparatus of FIG. 1 as seen along viewing lines IV—IV.

FIG. 5 is the view of FIG. 4 with additional components to illustrate various uses and advantages of the transition connection apparatus.

DETAILED DESCRIPTION OF THE PREFERRED EMBODIMENT

Figure 1:
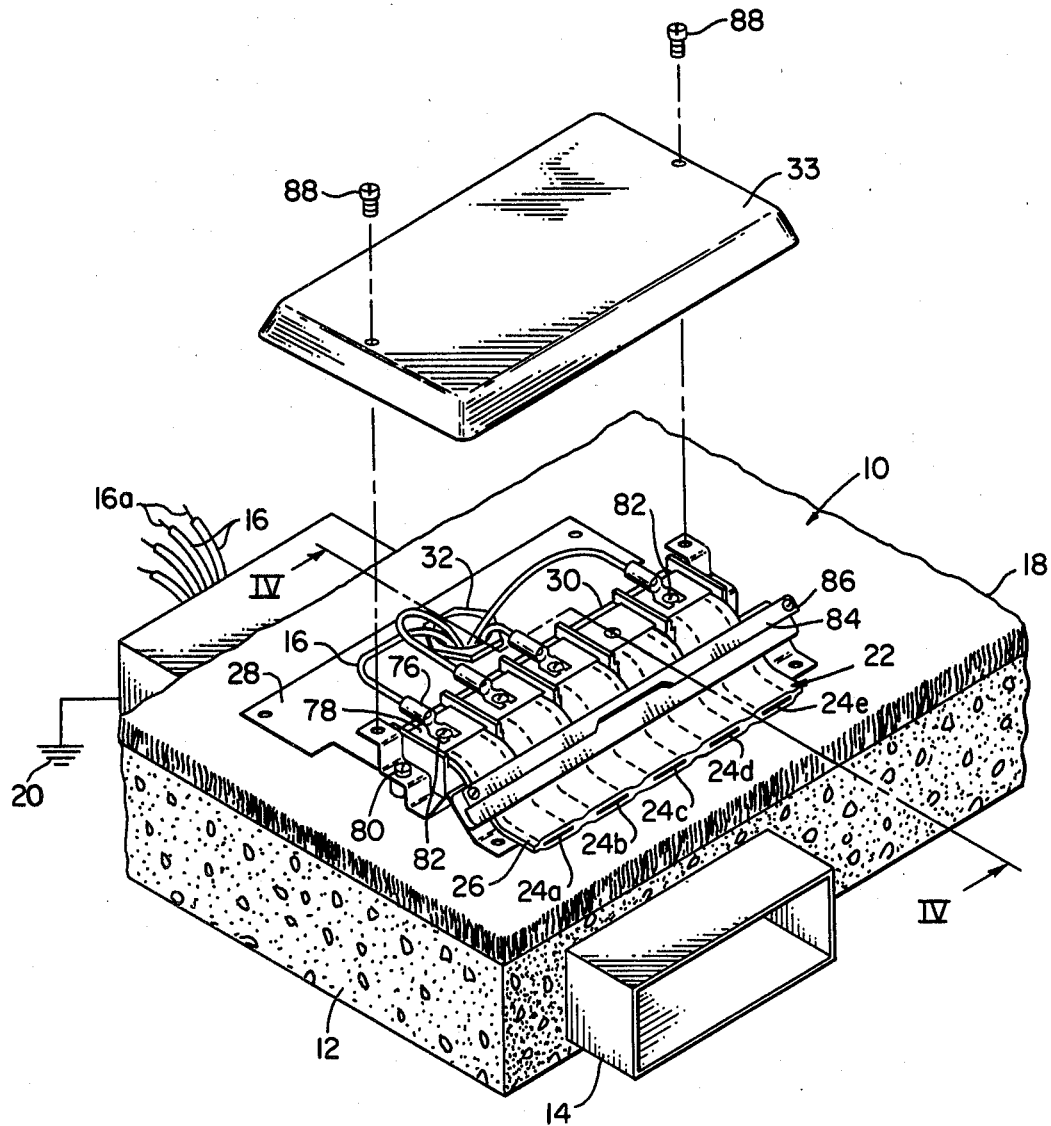
FIG. 1 is a perspective view, partially exploded, of a transition connection apparatus in accordance with a preferred embodiment.

Referring to the drawing, there is shown in FIG. 1 a floor transition assembly 10 according to the preferred embodiment for use in electrically connecting an undercarpet wiring system to an under-floor wiring system. As illustrated, there is embedded in the concrete floor 12 a metallic duct 14 carrying a plurality of power cables 16 therein, each such cable including a typically round conductor 16a. The duct 14, located beneath the floor covering or carpeting 18, is commonly connected to ground potential as at 20 by conventional grounding means (not shown).

The power cables 16 are connected by the transition assembly 10 to an insulated flat multiconductor cable 22 to provide power thereto, such cable adapted to lie on the surface of the concrete floor 12 beneath the carpeting 18. The cable 22 has a plurality of conductors 24a, 24b, 24c, 24d and 24e, that are each individually encased within an insulating casing 26. The cable 22 represents a typical five conductor system wherein conductors 24a, 24b and 24c are electrically "hot", conductor 24d is ground and conductor 24e is neutral. Other cables, such as, for example, a three conductor system of "hot", ground and neutral conductors may also be used. The cable 22 is preferably of the type comprising a shield of conductive material (not shown) thereon that runs along the entire length of the cable 22 and that is secured to the ground conductor 24d at successive lengthwise intervals as described in commonly assigned U.S. Pat. No. 4,283,593, issued on Aug. 11, 1981 and entitled "Multiconductor Cable." A portion of such shield may be interconnected together with the ground conductor 24d as provided herein.

The transition assembly 10 as shown in FIG. 1 generally comprises an electrically conductive base member 28 that supports an electrically insulative member 30 on which the electrical interconnections are made. The base member 28 is electrically connected to ground by means of a conductive, tubular, externally threaded nipple 32 and the connections are protected by a cover 33 as will be described. The particular details of the transition assembly 10 components may be more fully understood with reference to FIGS. 2 and 3.

In FIG. 2, the base member 28 as shown comprises a sheet of relatively thin conductive material such as cold rolled sheet having a thickness of about 0.060 inch (1.52 mm.). The base member 28, in the plan view, has a generally rectangular configuration having a lengthwise extent 28a and a lateral extent 28b. The base member 28 has a substantially flat planar portion 34 and an undulated portion 36. The undulated portion 36 has two inclined walls 36a and 36b that meet at a crest 36c, such crest 36c extending transversely across the base member 28 in the lateral direction 28b. In the preferred form, the root of wall 36a merges integrally with the planar portions 34 as at 38. A pair of threaded apertures 40 is provided through the wall 36b for securement of strain relief means for the flat conductor cable 22, as will be detailed.

At the lateral edges of the base member 28, there are provided a pair of mounting members 42, each member 42 being preferably formed integrally with the planar portion 34. Each member 42 is formed to have two surface portions 42a and 42b, respectively, that are spaced from the surface of the planar portion 34 at different distances, surface 42b being the farther away. An aperture 44 is provided through each surface 42a for mounting the insulative member 30 and a threaded aperture 46 is provided through each surface 42b for mounting the cover, as will be described. Openings 48 are provided through the base member 28 such as at the four corners thereof for securing the base member 28 to the floor 12. An opening 50, adapted to receive a portion of the nipple 32 therethrough, is provided through the planar portion 34.

Projecting from the undulated portion 36 is a plate member 52 that has a substantially flat portion 52b extending in overlying relation and substantially parallel to the base portion 34 and spaced therefrom at a preselected distance. The plate member 52 has width less than the lateral extent of the undulated portion 36 and is preferably formed integrally with the undulated portion 36 as in a stamping process such that an aperture 54 is caused to be formed in the base member 28. An aperture 56 is provided through the flat plate member portion 52b to allow securement of the plate member 52 to the insulative member 30 as will be detailed. In the preferred form, the entire base member 28 is formed integrally from a single sheet of stock material with the configuration as described being obtained with well known stamping and folding techniques. It should be appreciated that such components of the base member 28 as the mounting members 42 and the plate member 52 may be provided as separate components and subsequently secured to the base member 28 by other known fastening or joining techniques.

Referring now to FIG. 3, the details of the insulative member 30 are shown. Insulative member 30 in the preferred form comprises an elongate block 58 of nylon or other electrically insulative material having a generally rectangular cross-section. The block 58 has a pair of longitudinally spaced end walls 60 and 62 and a substantially flat lower surface 64 for being supported on the planar portion 34 of the base member 28 (FIG. 2). At each of the end walls 60 and 62 there is provided a projecting mounting boss 66 of height slightly less than the spacing between surface 42a and the surface of planar portion 34 (FIG. 2) so as to be insertable therebetween. Each of the mounting bosses 66 is provided with an opening 68 therethrough for receipt of a screw.

On the upper surface of the block 58 and spaced from the lower surface 64 there are a plurality of mounting surfaces 70a, 70b, 70c, 70d and 70e that are disposed longitudinally thereon. In the preferred form, the mounting surfaces 70a–70e are spaced longitudinally at intervals corresponding to the spacings of the conductors 24a–24e in the flat cable 22 (FIG. 1) to permit ease of mounting thereon. The individual mounting surfaces 70a–70e are electrically insulated from each other by ribs 72 extending upwardly from the surfaces and laterally across the block 58. An aperture 74 is formed in each of the mounting surfaces 70a–70e, each aperture preferably containing an internally threaded insert for threadably receiving a screw. The block 58 is formed in the preferred form to have its length less than the lateral extent of the base member 28 to accommodate mounting thereon by means of the mounting members 42 (FIG. 2) and the mounting bosses 66 on the block 58.

Referring now to FIGS. 1 and 4, the assembly of the transition apparatus is described. To effect assembly, the base member 28 is disposed on the floor 12 at a location where the floor 12 has a suitable opening 12a through which the under-floor cables 16 may be externally passed. The aperture 50 in the base member 28 is placed in registry with the opening 12a. The cable conductors 16a are each terminated with a standard crimpable conductive lug 76. The terminated cables 16 are fed through the tubular nipple 32, the nipple 32 being threaded into the grounded metallic duct 14, a shoulder portion 32a of the nipple 32 compressively engaging the surface of the planar portion 32 adjacent the aperture 50. The flat cable conductors are each terminated with a flat terminal connector 78 such as that shown and described in commonly assigned U.S. Pat. No. 4,256,359, issued Mar. 17, 1981 to Storck.

The insulative member 30 is secured to the base member 28 adjacent the undulated portion 36 as by screws 80, the lengthwise direction of the insulative member 30 being substantially parallel the crest 36c. The mounting surfaces 70a–70e are spaced from the surface of the planar portion 34 and extend substantially parallel thereto. The plate member portion 52b extends in overlying adjacent relation to one of the mounting surfaces of the block 58, namely mounting surface 70d. In the particular arrangement shown, there are four power cables 16 shown, three of which have electrically "hot" conductors 16a and the other a neutral conductor 16a. The three "hot" conductors 16a are joined respectively to the flat conductors 24a, 24b and 24c respectively on mounting surfaces 70a, 70b and 70c by screws 82 that bring the lugs 76 and terminal connectors 78 into engagement. The neutral conductor 16a is similarly joined to the flat conductor 24e on mounting surface 70e by a screw 82. The remaining flat conductor 24d and the plate member portion 52b are mounted to the mounting surface 70d as by a screw 82 that brings terminal connector 78 contacting conductor 24d and the plate member portion 52b into engagement.

As thus assembled, the electrically "hot" conductors and the neutral conductor are interconnected on the mounting surfaces 70a–70e of the block 58. A ground path is established from the grounded metallic duct 14 through the conductive nipple 32, through the base member 28 and then through the plate member 52 which is coupled to flat cable conductor 24d. Thus, the conductor 24d is electrically grounded without need of additional jumper wires.

The transition assembly 10 as described may also comprise strain relief means for holding the conductors in the flat cable 22 in a fixed position relative to the base member 28. Such strain relief means may comprise an elongate bar 84 adapted to extend laterally across the width of the cable 22 as shown in FIG. 1 and to engage the cable 22 under the influence of screws 86 that threadably engage the apertures 40 (FIG. 2) in the wall 36b of the undulated portion 36. The cover 33 for concealing the interconnections may be formed of a conductive metal such as cold rolled steel. By conductively connecting such cover 33 to the base member 28 as by screws 88 that threadably engage the apertures 46 in the mounting members 42 (FIG. 2) the cover 33 will also be electrically grounded.

Having thus described the present invention of the transition assembly 10 in the preferred embodiment of making electrical interconnections between round conductors in a grounded duct and flat conductors in a flat multiconductor cable, it should be appreciated that various modifications may be made for use with other interconnections within the intended scope of the invention. For example as shown in FIG. 5, the transition assembly 10 as herein described may be utilized in a pedestal or electrical outlet apparatus whereby the cover is replaced by a housing 90 adapted to enclose one or more electrical receptacles such as those shown at 92 and 94. Wires 96 and 98, respectively, from these receptacles 92 and 94, which wires may be for electrically "hot", neutral or ground interconnections, are joined at the mounting surfaces 70a–70e in accordance with the electrical interconnection desired. Thus, as shown, four sets of plural wires are interconnected in the transition assembly 10, three sets of round wires and one set of flat conductors. In another arrangement, the flat cable 22 may be eliminated with the transition assembly 10 providing for interconnection between the round under-floor cables 16 and the round wires 96 and 98 of the receptacles with attendant grounding advantage.

In a further arrangement, the transition assembly 10 may be used to make a transition from under-carpet cable such as cable 22 to the round wires of a receptacle wherein the cable 22 is suitably coupled to a power source and is carrying current and one of the conductors is coupled to ground. In the illustration of FIG. 5, the under-floor cables 16 and nipple 32 would be eliminated. Connection of the grounded conductor of the flat cable 22 to the plate member portion 52b would establish a ground potential at the mounting surface whereat they are joined and render the base member electrically grounded. Ground wires of wires 96 and 98 may be interconnected at the mounting surface and a cover or housing may also be grounded by conductive coupling to the base member 28.

While the invention has been described herein in the embodiment of a floor mounted arrangement, it should be appreciated that the transition assembly 10 may also be utilized in other surface mounting arrangements such as a wall or partition whereon electrical interconnections are desired.

Various changes to the foregoing described and shown structures will now be evident to those skilled in the art. Accordingly, the particularly disclosed preferred embodiments are intended in an illustrative and not in a limiting sense. The true spirit and scope of the invention are set forth in the following claims.

What is claimed is:

1. A transition connection apparatus for making electrical interconnection between electrical conductors, comprising:

an insulative member having a plurality of mounting surfaces for joining a plurality of conductors thereon, such mounting surfaces being electrically insulated from each other;

a conductive base member supporting said insulative member;

a conductive plate member secured to said base member and having a portion adjacent to and in registry with one of said mounting surfaces; and means for fastening a conductor and said plate member portion to said one of said mounting surfaces.

2. A transition connection apparatus according to claim 1, wherein said base member comprises a substantially flat planar portion, said insulative member being supported on said planar portion.

3. A transition connection apparatus according to claim 2, wherein said insulative member comprises an elongate block of generally rectangular cross-section and wherein said mounting surfaces thereon lie substantially parallel said planar portion and spaced therefrom.

4. A transition connection apparatus according to claim 3, wherein said elongate block member extends transversely across said base member, the transverse extent of said base member being greater than the longitudinal extent of said block member.

5. A transition connection apparatus according to claim 3, wherein said base member includes an undulated portion defining a crest thereon, said crest extending transversely across said base member, a root of said undulated portion merging from said planar portion.

6. A transition connection apparatus according to claim 5, wherein said plate member is an integral portion of said base member.

7. A transition connection apparatus according to claim 6, wherein said plate member projects from said undulated portion in a direction substantially parallel said planar portion.

8. A transition connection apparatus according to claim 7, wherein said elongated block member is disposed adjacent a root of said undulated portion and extending lengthwise substantially parallel with said crest, said projecting plate member overlying said mounting surface.

9. A transition connection apparatus according to claim 5, further including strain relief means on said base member for firmly retaining a plurality of conductors in a fixed position relative to said base member.

10. A transition connection apparatus according to claim 9, wherein said strain relief means comprises an elongate member for engagement with an insulated flat conductor cable.

11. A transition connection apparatus according to claim 9, wherein said strain relief means is mounted on said undulated portion of said base member.

12. A transition connection apparatus according to claim 1, further including a conductive cover enclosing said insulative member and conductively connected to said base member.

13. A transition connection apparatus for making electrical interconnection between at least two sets of plural electrical connectors, comprising:
   an insulative member having a plurality of mounting surfaces for joining thereon a plurality of conductors, such mounting surfaces being electrically insulated from each other.
   a conductive base member supporting said insulative member, said base member having a portion extending therefrom and disposed adjacent to and in registry with one of said mounting surfaces;
   means for joining a conductor from each of said sets on plural of said mounting surfaces;
   means for fastening a conductor from at least one of said sets and said base member portion on said mounting surface adjacent each portion; and
   means electrically coupling said base member to an electrical ground.

14. A transition connection apparatus according to claim 13, wherein said insulative member comprises an elongate block on which said mounting surfaces are longitudinally disposed, said block being adapted to join thereon two sets of plural conductors, one set of which comprises conductors in an insulated flat conductor cable.

15. A transition connection apparatus according to claim 14, further including means supporting a further set of conductors, said further set of conductors being joined on said elongate block with said other two sets of conductors.

16. A transition connection apparatus according to claim 14, further including strain relief means coupled to said base member for engaging said insulated flat conductor cable.

17. A transition connection apparatus for making electrical interconnection between a first set of round conductors in an electrically grounded conduit and a second set of conductors in an insulated flat cable, comprising:
   an insulative member having a plurality of mounting surfaces for joining thereon a plurality of conductors from said first and second sets, such mounting surfaces being electrically insulated from each other;
   a conductive base member supporting said insulative member, said base member having an extension disposed adjacent to said insulative member and in registry with an exclusive one of said mounting surfaces;
   means for joining the conductors of said first set and a corresponding number of conductors of said second set on said mounting surfaces;
   means for fastening a conductor of said second set and said extension of said base member to said mounting surface in registry with such extension; and
   means for electrically coupling said base member and said grounded conduit.

18. A transition connection apparatus according to claim 17, wherein said coupling means comprises a threaded nipple.

19. In a transition connector for use in making electrical interconnection between conductors of plural electrical cables wherein one of said conductors is to be at ground potential, said transition connector being of the type having an insulative member including a plurality of electrically insulated mounting surfaces for joining such conductors thereon, a grounding apparatus comprising a conductive base member for supporting said insulative member, a conductive plate member secured to said base member and disposed to lie adjacent to and in registry with one of said mounting surfaces, and means for joining said plate member and said one conductor to be at ground potential on said one mounting surface for providing thereby a common electrical potential between said base member and said one joined conductor.

20. A grounding apparatus according to claim 19, wherein said plate member is integral with said base member and extends therefrom.

21. A grounding apparatus according to claim 19, further including means for coupling said base member to an electrical ground.

22. A grounding apparatus according to claim 19, further including a conductive cover for enclosing said insulative member, said cover being conductively connected to said base member.

* * * * *